United States Patent [19]

Okayama et al.

[11] 4,215,210
[45] Jul. 29, 1980

[54] NOVEL α-GLYCOL RESIN COMPOSITION AND PROCESS FOR ITS PREPARATION

[75] Inventors: Kiyoaki Okayama; Yojiro Yamamoto, both of Yokkaichi, Japan

[73] Assignee: Mitsubishi Petrochemical Company Limited, Tokyo, Japan

[21] Appl. No.: 914,161

[22] Filed: Jun. 9, 1978

[30] Foreign Application Priority Data

Jun. 13, 1977 [JP] Japan ................... 52/68926

[51] Int. Cl.² .................. C08G 65/28; C08G 59/06
[52] U.S. Cl. ........................ 528/93; 528/87; 528/89; 528/90; 528/95; 260/348.15; 568/631; 568/640
[58] Field of Search .......... 260/613 R, 348.15, 348.64; 528/87, 89, 90, 93, 95, 110; 568/640, 631

[56] References Cited

U.S. PATENT DOCUMENTS

| | | | |
|---|---|---|---|
| 2,558,949 | 7/1951 | Greenlee | 260/47 |
| 3,405,093 | 10/1968 | Walker | 260/47 |
| 3,477,990 | 11/1969 | Dante et al. | 260/47 |

OTHER PUBLICATIONS

Brzozowski et al., "Heat and Chemical Resistant Polyurethane Materials", Chemical Abstracts 85, 47517u, (1976).

*Primary Examiner*—Earl A. Nielsen
*Attorney, Agent, or Firm*—Sherman & Shalloway

[57] ABSTRACT

A novel resin composition which is composed of molecules having an epi-bis type main skeleton of the formula

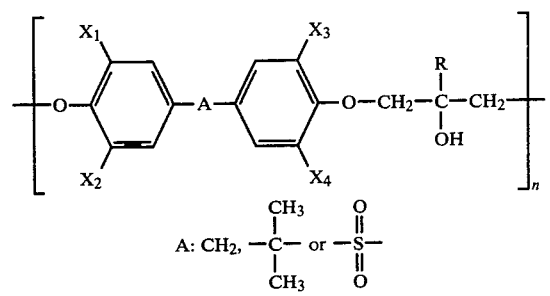

$X_1$–$X_4$: H, Cl or Br
R: H, or $CH_3$ and has a Gardner-Holdt viscosity of C to $Z_8$ determined at 25° C. for a solution in butyl carbitol in a concentration of 40% by weight.

At least 40% of the entire terminal groups of the molecules of the novel composition consists of α-glycol groups of the formula

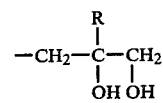

wherein R represents hydrogen or methyl.

The composition is more rapidly curable at lower temperatures than known epoxy resins having an epi-bis type main chain skeleton, and is useful as a paint or adhesive and also as an adhesion improver for other resins.

19 Claims, No Drawings

NOVEL α-GLYCOL RESIN COMPOSITION AND PROCESS FOR ITS PREPARATION

This invention relates to a novel α-glycol resin composition and a process for its production. More specifically, the invention relates to a novel α-glycol resin composition which has an epi-bis type structure derived from a dihydric phenol compound and an epihalohydrin

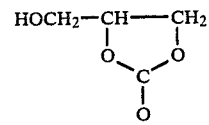

to form a di(α-glycol) ether of bisphenol A expressed by the following formula

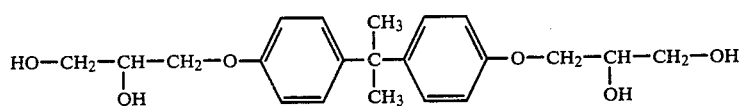

and in which at least 40 mole% of the entire terminal groups consists of terminal α-glycol groups expressed by the following formula

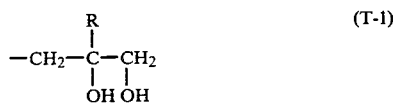

(T-1)

wherein R represents a hydrogen atom or a methyl group; and to a process for its preparation.

A process for preparing an organic solvent-soluble epoxy resin (composition) has previously been known which comprises reacting a dihydric phenol such as bisphenol A or its halogen-substituted derivative with a molar excess of an epihalohydrin in the optional presence of an etherification catalyst for the dihydric phenol and epihalohydrin, and reacting the reaction product with an alkali metal hydroxide (Japanese Patent Publication No. 13840/77).

Another process for preparing the aforesaid epoxy resin is also known which comprises reacting in one or more stages the dihydric phenol and epihalohydrin in the presence of the alkali metal hydroxide in water and/or an organic solvent.

The known epoxy resins obtained by the aforesaid two-step and one-step processes contain terminal groups most (usually 80 to 95 mol%) of which are epoxy groups. These epoxy resins form cured shaped articles, coatings or bonded films by reacting them with curing agents such as polyamines or acid anhydrides.

Most of the terminal groups of the known epoxy resins consist of epoxy groups. Depending upon the conditions for their preparation, they may contain a small amount of terminal α-glycol groups, but the amount of the α-glycol groups is at most about 10 mole%.

A process has also been known heretofore which comprises reacting a dihydric phenol such as bisphenol A with 1,2-glycerol carbonate of the following formula (U.S. Pat. No. 3,088,980). According to this process, however, 1,2-glycerol carbonate reacts with a phenolic hydroxyl group, and changes into a non-reactive terminal α-glycol group. A resin composition, therefore, cannot be prepared, and moreover, the production of 1,2-glycerol carbonate itself is by no means easy, and is costly.

According to this invention, however, there is provided a novel reactive resin composition which has the same epi-bis skeleton as an epoxy resin formed by the reaction of a dihydric phenol with an epihalohydrin and in which at least 40 mole%, preferably at least 60 mole%, or more preferably at least 90 mol%, of the entire terminal groups are α-glycol groups expressed by the following formula

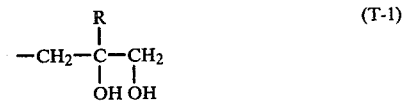

(T-1)

wherein R represents a hydrogen atom or a methyl group. In the present application, this resin composition will be referred to as an α-glycol resin composition.

The invention also provides a process for preparing the α-glycol resin composition.

The novel reactive α-glycol resin composition of this invention is expressed by the following general formula

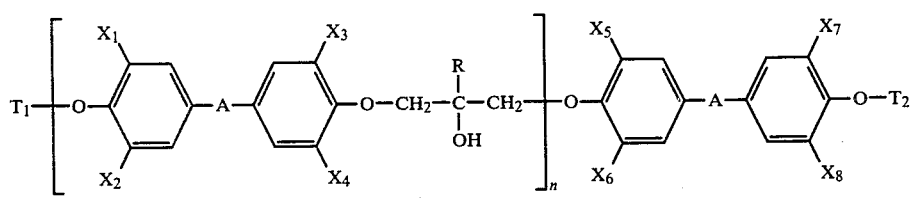

(I)

wherein A represents the group —CH$_2$—,

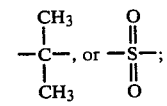

R represents a hydrogen atom or a methyl group; $X_1$, $X_2$, $X_3$, $X_4$, $X_5$, $X_6$, $X_7$ and $X_8$ are identical or different and each represent a hydrogen, chlorine or bromine atom; $T_1$ and $T_2$ represent terminal groups which are identical or different and are atoms or atomic groups selected from the group consisting of

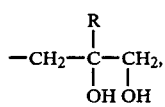 (T-1)

(T-2) a hydrogen atom (—H),

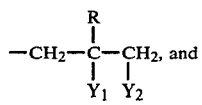 (T-3)

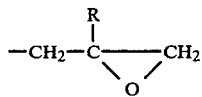 (T-4)

in which R is as defined above, one of $Y_1$ and $Y_2$ represents a hydroxyl group and the other represents a chlorine or bromine atom; and n represents the average degree of polymerization of the resin which is a positive number greater than 0, generally 1 to 20, preferably 1 to 8, and at least 40 mole% of its entire terminal groups (the sum of $T_1$ and $T_2$) consists of α-glycol groups of the following formula

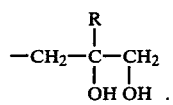

A solution of the resin composition in butyl carbitol in a a concentration of 40% by weight has a Gardener Holt viscosity, measured at 25° C., of C to $Z_8$.

The novel α-glycol resin of general formula (1) can be prepared, for example, by the following processes (A), (B) and (C).

Process A

The novel α-glycol resin composition can be prepared by reacting (1) a dihydric phenol expressed by the following formula II, (2) an epihalohydrin of the following formula III, and (3) at least 4 moles, preferably 9 to 12 moles, per mole of the epihalohydrin, of water in the presence of an etherification catalyst for the phenol and epihalohydrin (the first-step reaction), and reacting the reaction product with an alkali metal hydroxide (the second step reaction).

(1) a dihydric phenol:

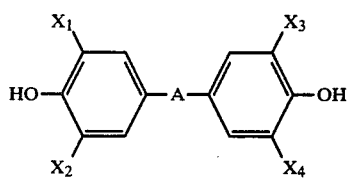 (II)

wherein A represents the group —$CH_2$—,

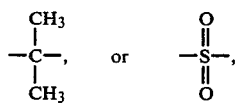

and $X_1$, $X_2$, $X_3$ and $X_4$ are identical or different, and each represent a hydrogen, chlorine or bromine atom, (2) an epihalohydrin:

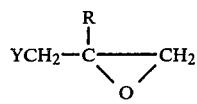 (III)

wherein R represents a hydrogen atom or a methyl group, and Y represents a chlorine or bromine atom.

It is believed that according to process A, the following reactions (A-1) and (A-2) mainly take place concurrently in the first-step reaction in the same reaction vessel.

(A-1) Reaction of the epihalohydrin with water:

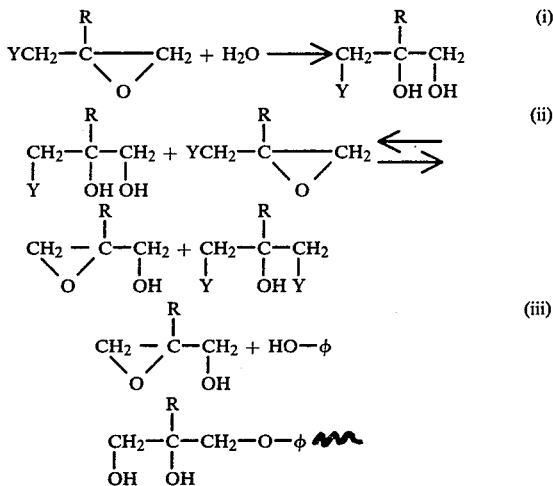

In the reaction formulae (i), (ii) and (iii), R and Y are the same as defined hereinabove with regard to formula (III), and HO-φ〰 represents the phenolic hydroxyl groups of the dihydric phenol.

(A-2) Reaction of the epihalohydrin with the phenolic hydroxyl group:

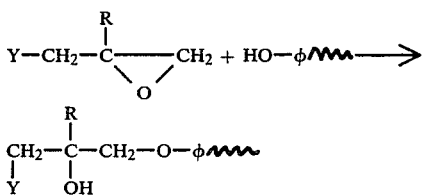

In the second-step reaction of process A, the following reactions (B-1), (B-2) and (B-3) are believed to take place concurrently in the same reaction system.

(B-1) Reaction of the halohydrin ether formed by reaction (A-2) with an alkali metal hydroxide:

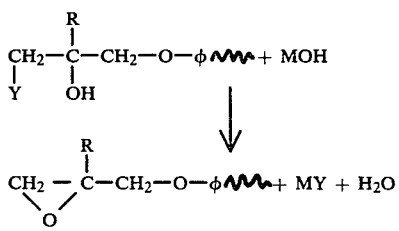

(B-2) Reaction of the product of (B-1) with the phenolic hydroxyl groups:

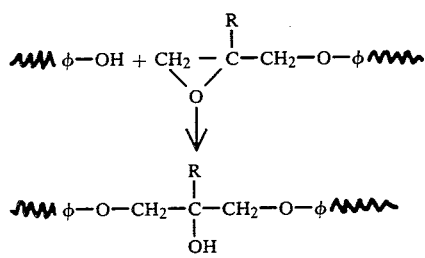

(B-3) Reaction of the dihalohydrin formed in (ii) of (A-1) with an alkali metal hydroxide:

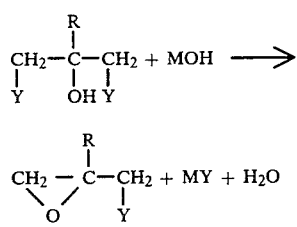

The epihalohydrin formed by this reaction is consumed by the same reaction as (A-1).

In process A, it is especially preferred to react the dihydric phenol compound, the epihalohydrin and at least 6 moles, per mole of the epihalohydrin, of water. By this reaction procedure, it is possible to obtain an α-glycol resin composition in which at least about 40 mole% of the entire terminal groups consists of the terminal α-glycol groups (T-1), although the content of the terminal α-glycol groups may vary according to the other reaction conditions.

As shown by (i) of (A-1) above, in process (A), the proportion (%) of the terminal α-glycol groups in the resulting resin composition can generally be increased by increasing the amount of water in the reaction system.

The first-step reaction of process A is carried out at 90° to 150° C., preferably at 100° to 140° C. At higher temperatures, the proportion of the terminal α-glycol groups in the entire terminal groups of the resin composition generally increases. However, at higher reaction temperatures, the internal pressure of the reaction vessel increases.

The etherification catalyst for the phenol and epihalohydrin used in the first-step reaction of process A may be any compounds known to be usable as such as catalyst. Examples are tertiary phosphines and quaternary phosphonium compounds such as triphenylphosphine, tributyl phosphine or tetraphenyl phosphonium chloride; organic sulfides and sulfonium compounds, such as dibutyl sulfide, diisopropyl sulfide or trimethyl sulfonium iodide; betaine compounds; and tertiary amines such as triethylamine or N,N'-dimethylaniline. Superior catalysts are quaternary ammonium compounds such as tetramethyl ammonium chloride, tetraethyl ammonium chloride and tetramethyl ammonium bromide. In particular, tetramethyl ammonium chloride and tetramethyl ammonium bromide are advantageous because of their low costs and high catalytic activities. Advantageously, the etherification catalyst is added in an amount of 0.002 to 0.5 mole% based on the phenolic hydroxyl groups.

The second-step reaction of process A is carried out at a temperature of 60° to 150° C., preferably 80° to 120° C. The suitable amount of the alkali metal hydroxide (MOH) is at least 1 mole per mole of the epihalohydrin. Suitable alkali metal hydroxides are sodium hydroxide and potassium hydroxide. The alkali metal hydroxide can be used in the form of a solid, but it is preferably used as an aqueous solution.

The reaction in the first step is carried out for at least 5 minutes, preferably for at least 10 minutes, and the second-step reaction, for at least 15 minutes, preferably for at least 20 minutes. There is no particular upper limit to the reaction period, but too long a reaction time is unnecessary and uneconomical.

The first-step and second-step reactions may be carried out in the presence of an inert organic solvent such as methyl isobutyl ketone, methyl ethyl ketone or toluene.

Process B

The α-glycol resin composition of the invention can also be prepared by a process which comprises reacting (1) dihydric phenol compound of the formula II, (2) and epihalohydrin of the formula III and (3) a glycerin monohalohydrin of the following formulae IVa and/or IVb in the presence of an alkali metal hydroxide under such conditions that α-glycol groups derived from the glycerin monohalohydrin constitute at least 40 mole% of the entire terminal groups.

(3) a glycerin monohalohydrin:

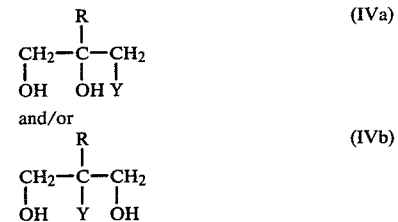

wherein R represents a hydrogen atom or a methyl group, and Y represents a chlorine or bromine atom.

In process B, the dihydric phenol, the epihalohydrin and the glycerin monohalohydrin are reacted in the presence of an alkali metal hydroxide at a temperature of 60° to 150° C., preferably 80° to 120° C.

The suitable amount of the alkali metal hydroxide is at least 1 mole, especially 1.05 to 1.5 moles, per mole of the sum of the epihalohydrin and the glycerin monohalohydrin.

According to process B, the average molecular weight of the α-glycol resin composition can be controlled by changing the proportions of the epihalohydrin and the glycerin monohalohydrin. The average molecular weight of the α-glycol resin composition can be increased with increasing proportion of the epihalohydrin, and can be decreased by increasing the proportion of the glycerin monohalohydrin.

In theory, the proportions of the starting materials are such that the result of subtracting the number of equivalents of the glycerin monohalohydrin from that of the equivalents of the phenolic hydroxyl groups is two times the number of the equivalents of the epihalohydrin. In practice, however, the proportions of the starting materials can be varied according to side-reactions or the proportion of the terminal α-glycol groups in the desired resin composition.

The same alkali metal hydroxides as exemplified above with regard to the second-step reaction of process A can be used in process B. Preferably, the alkali metal hydroxide is added in the form of an aqueous solution.

The reaction in process B is carried out for at least 10 minutes, especially for at least 15 minutes. The desired reaction can be completed in 1 hour at the longest.

The reaction in process B can also be performed in the absence of solvent. But preferably, it is performed in the presence of water or an inert (non-reactive) organic solvent such as methyl isobutyl ketone, methyl ethyl ketone or toluene.

Process C

The α-glycol resin composition of this invention can also be prepared by a process which comprises, reacting a divalent phenol compound expressed by the formula II with an epihalohydrin of the formula III in the presence of an alkali metal hydroxide, the molar ratio of the dihydric phenol compound to the epihalohydrin being maintained at more than 1 (the first-step reaction), and when at least 50% of the epihalohydrin has been consumed by the reaction, reacting the reaction product of the first-step with at least 1 mole, per mole of the terminal phenolic hydroxyl groups, of a glycerin monohalohydrin of the formulae IVa and/or IVb, in the presence of an alkali metal hydroxide (the second-step reaction).

The same alkali metal hydroxides as exemplified hereinabove with regard to processes A and B can be used in the aforesaid first-step and second-step reactions. Preferably, the alkali metal hydroxide is used in the form of an aqueous solution.

The amount of the alkali metal hydroxide used is at least 1 mole, preferably 1.05 to 1.5 moles, per mole of the epihalohydrin in the first step, and at least 1 mole, preferably 1.05 to 1.5 moles, per mole of the glycerin monohalohydrin.

The first-step and second-step reactions can also be performed in the absence of solvent. Advantageously, these reactions are carried out in the presence of water or an inert organic solvent such as methyl isobutyl ketone, methyl ethyl ketone or toluene, especially in the presence of water. Preferably, both the first-step and second-step reactions are performed at a temperature of 60° to 150° C., preferably 80° to 130° C.

Both in the first and second steps, the reaction time is at least 10 minutes, preferably at least 15 minutes. The reaction is completed usually within 1 hour.

In process C, a resin composition having an epibis main chain skeleton and phenolic hydroxyl groups as terminal groups is formed as a main product in the first-step reaction. In the second-step reaction, a reaction of the phenolic hydroxyl groups with the glycerin monohalohydrin to convert them into terminal glycol groups proceeds as a main reaction.

Among these manufacturing processes, the processes A and B are especially preferred.

In these processes, bisphenol A of formula (II) in which A is

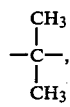

and $X_1$, $X_2$, $X_3$ and $X_4$ are hydrogen atoms is especially preferred as the dihydric phenol because it is available at low cost and will give a resin composition having superior properties.

A compound of formula (II) in which A is

and $X_1$, $X_2$, $X_3$ and $X_4$ are bromine atoms is also marketed. The use of this dihydric phenol can afford a resin composition having thermal stability and flame resistance.

Epichlorohydrin is especially advantageous as the epihalohydrin of formula (III).

Among the compounds of formula (IVa) and/or (IVb), glycerin monochlorohydrin (R=H, Y=Cl) is especially advantageous.

Thus, preferred α-glycol resin compositions are those of formula (I) in which A is the group

all of $X_1$ to $X_8$ are hydrogen atoms, and R is a hydrogen atom. Those of formula (I) in which in the following formula representing the terminal groups $T_1$ and/or $T_2$,

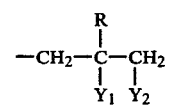

R is as defined above, and one of $Y_1$ and $Y_2$ is a hydroxyl group and the other is a chlorine atom are advantageous.

The α-glycol resin composition prepared by process A, B or C can be purified and isolated, for example, by (1) washing the reaction mixture with warm water to remove an alkali metal halide such as sodium chloride, and evaporating off the water, or (2) dissolving the reaction mixture in a water-insoluble or sparingly water-soluble organic solvent such as methyl isobutyl ketone, methyl ethyl ketone or toluene, contacting the solution with water or warm water to dissolve the inorganic impurities in the aqueous layer, and distilling off the organic solvent to obtain the resin composition.

The amount of the terminal epoxy groups or phenolic hydroxyl groups of the resulting resin composition of the invention can be decreased, and its average molecular weight can be increased, by any of the following procedures.

(3) When some amounts of the terminal epoxy groups remain, the resin composition is reacted with the dihydric phenol of formula (II) in an amount equivalent to, or less than, the epoxy groups.

(4) When some amounts of phenolic hydroxyl groups remain as terminal groups, the resin composition is reacted with a known epoxy resin in an amount equivalent to, or less than, the phenolic hydroxyl groups.

These procedures also serve to increase the proportion of the α-glycol groups in the entire terminal groups.

Suitable etherification catalysts for the reactions (3) and (4) above are those exemplified hereinabove with regard to the first step reaction of process A. Both in the reactions (3) and (4), the advantageous reaction temperature is 120° to 250° C., especially 150° to 220° C.

According to the present invention, any of the processes A, B and C can, under properly selected reaction conditions, afford a novel α-glycol resin composition whose 40% by weight solution in butyl carbitol has a Gardner-Holdt viscosity, measured at 25° C., of C to $Z_8$, and which has the main chain structure expressed by formula (I), at least 40 mole% of the entire terminal groups (the sum of $T_1$ and $T_2$) consisting of α-glycol groups (T-1) of the following formula

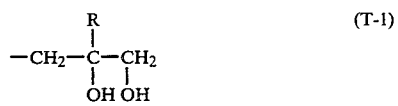

(T-1)

wherein R represents a hydrogen atom or a methyl group.

Preferably, the α-glycol resin composition contains the α-glycol terminal groups of formula (T-1) in an amount of at least 60 mole%, especially 70 to 95 mole% or even more, based on the entire terminal groups.

The molecular terminals of the α-glycol resin of the present invention may contain hydrogen atoms,

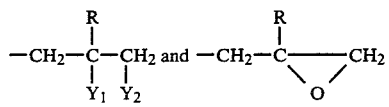

in addition to the α-glycol groups of formula (T-1). In the above formula R represents a hydrogen atom or a methyl group, one of $Y_1$ and $Y_2$ represents a hydroxyl group, and the other represents a chlorine or bromine atom. The total amount of these atoms or groups is up to 60 mole%, preferably 30 to 5 mole%, based on the entire terminal groups (the sum of $T_1$ and $T_2$). Separately, the preferred range of the content of hydrogen atoms is 0 to 40 mole%, especially 0 to 20 mole%; the preferred amount of the group of the formula

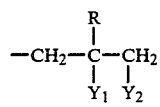

is 0 to 40 mole%, more preferably 0 to 20 mole%; and the preferred amount of the group of the formula

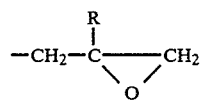

is 0 to 40 mole%, more preferably 0 to 20 mole%.

The process disclosed in the above-cited U.S. Pat. No. 3,088,980 gives only a monomeric di-α-glycol ether of a dihydric phenol. In contrast, according to the process of this invention in combination with method (3) or (4) described above can afford a high-molecular-weight α-glycol resin composition having a Gardner-Holdt viscosity of D to $Z_7$ or higher. Moreover, the average molecular wieght (the degree of polymerization) of the resin composition can be adjusted to the desired value by properly controlling reaction conditions such as the mole ratios of the starting materials, the reaction temperature, and the reaction time in process A, B or C. Preferred α-glycol resin compositions of this invention have a high average molecular weight expressed by a Gardner-Holdt viscosity, for a 40% by weight solution in butyl carbitol at 25° C., of D to $Z_7$, especially E to $Z_3$. The α-glycol resin compositions having a Gardner-Holdt viscosity within the abovespecified range can be used directly for molding, or in various applications such as paints and adhesives.

Various types of epoxy resins have been known heretofore. These resins are cured by reaction with various curing agents, or with other thermosetting resins such as phenolic resins, and put to various uses such as various molded articles, coating compositions, paints, lacquers and adhesives. In particular, epoxy resins derived from bisphenol A have superior mechanical strength, electrical insulation, water resistance, chemical resistance, flexibility and adhesiveness because of their structural characteristics based on the bisphenol A skeleton.

However, these epoxy resins are limited in uses involving room-temperature curing, especially in outdoor uses in the wintertime because their rate of curing at low temperatures is slow. It has been suggested to increase the rate of curing tar-epoxy resins intended for use in the wintertime by modifying them with ethanolamine, for example. The modification, however, increases the number of process steps and causes an increase in cost. Moreover, it has the disadvantage of deteriorating the chemical resistance and thermal stability of the cured products.

Uses have also been developed in which an epoxy resin is reacted with a polyisocyanate to achieve rapid-curing properties and exceptionally good chemical resistance by the combination of the superior alkali resistance of an epoxy resin-base paint and the superior acid resistance of an isocyanate-base paint. However, since the secondary hydroxyl group of the epoxy resin has only a low reactivity with the isocyanate, the amount of the isocyanate must be increased.

In contrast, the α-glycol resin composition of this invention has various advantages listed below.

(A) It has a similar skeleton to an epoxy resin and large amounts of hydroxyl groups based on α-glycol groups at the terminals. Furthermore, the hydroxyl groups of the terminal α-glycol groups are primary and have a high reactivity. Accordingly, these hydroxyl groups very readily react with a polyisocyanate, for example, to afford a cured product having a high hardness.

(B) As a low-molecular-weight resin composition, the composition of this invention cures rapidly at low temperatures without the need for modification with, for example, ethanolamine required for conventional epoxy resins. Moreover, coated films from the composition of the invention have superior physical and chemical properties such as chemical resistance and thermal stability.

(C) As a high-molecular-weight resin composition, too, the composition of this invention has rapid curability, and cwn be baked at low temperatures. The resulting molded products or coated films have superior flexibility.

(D) The reactivity of the composition with a polyisocyanate is high, and therefore, a cured product can be obtained by using a small amount of the polyisocyanate. The cost of production can accordingly be reduced.

(E) It can be used also as a polyol for the production of polyurethane or polyester.

(F) It can be used as a hot-melt type or solution type adhesive in a wide range of applications, and is also useful as an adhesion improver for various thermosetting and thermoplastic resins.

In regard to (A), the α-glycol resin composition can be used as a two-package urethane paint in combination with a polyisocyanate compound (Japanese Patent Application No. 62299/78 filed May 26, 1978). As regards (F), the α-glycol resin of this invention can be used as a binder resin for an electrophotographic toner consisting essentially of a colorant and the binder resin (Japanese Patent Application No. 40197/78).

Japanese Patent Application No. 62299/78 filed May 26, 1978 states that when the α-glycol resin composition is mixed with a certain polyisocyanate in such a mixing ratio that the molar ratio of the isocyanate groups in the polyisocyanate to the hydroxyl groups of the α-glycol resin (NCO/OH) is from 0.1 to 2.0, and the mixture is coated on a substrate, the hydroxyl groups of the α-glycol resin readily react with the isocyanate group of the polyisocyanate at room temperature to form a urethane linkage and a coated film having superior properties can be formed. Polyisocyanates described in the cited Japanese Patent Application are (a) tolylene diisocyanate, diphenylmethane diisocyanate, xylylene diisocyanate, hexamethylene diisocyanate, isophorone diisocyanate, trimethylhexamethylene diisocyanate, or a dimer or trimer of such a diisocyanate, (b) a polyisocyanate prepolymer resulting from the addition of a polyol such as trimethylol propane to the polyisocyanate compound (a), (c) a blocked isocyanate prepared by protecting the isocyanate groups of the polyisocyanate compound (a) with a blocking agent such as phenol, cresol, an aromatic secondary amine, a tertiary alcohol, a lactam or an oxime to inactivate them and (d) mixtures of the compounds (a), (b) and (c).

Although known epoxy resin paints are widely used as anticorrosive paints having good alkali resistance, water resistance and adhesion strength, they have the disadvantage that their rate of curing at low temperature is slow, and they do not cure in the wintertime. To improve their curability at low temperatures, it is the practice to modify them with dialkanolamines such as diethanolamine or diisopropanolamine and cure them with isocyanate compounds. The conventional dialkanolamine-modified epoxy paints are expensive and have non-uniform quality and poor acid resistance. Moreover, it is difficult to accurately determine their quantity with respect to the isocyanate compounds.

In contrast, the two-package paint comprising the α-glycol resin composition of this invention and a polyisocyanate compound is free from the disadvantage of the conventional epoxy resin paints and dialkanolamine-modified epoxy paints. It has very good curability at low temperatures, and can be used even in the wintertime. Moreover, it has uniform quality, gives coated films having superior chemical resistance, and is low in cost.

According to Japanese Patent Application No. 40197/78, the α-glycol resin composition of this invention is an excellent binder resin which has both a low melt viscosity required of binder resins for electrophotographic toners (i.e., it can be fixed under heat at a high speed) and a high melting point or a high sticking temperature (i.e., the adhesiveness of the toner is small, and its melt-adhesion to a carrier or a photo-conductive insulation layer and blocking of toner particles do not significantly occur).

Epoxy resins, polyester resins, styrene resins, styrene-acrylate copolymer resins and mixtures of these which have heretofore been used as binders for electrophotographic toners cannot meet these two requirements at the same time. For example, epoxy resins which has the desired low melt viscosity have a melting point of as low as 43° C., and melt-adhere to a carrier and an insulation layer or undergo blocking in the summertime.

The α-glycol resin of this invention has a similar chemical structure as an epoxy resin, but contains more hydroxyl groups than the epoxy resin and the molecules are bonded to one another by a strong hydrogen bond. Thus, an α-glycol resin in accordance with this invention has a higher glass transition temperature than an epoxy resin having the same molecular weight. In other words, at the same glass transition temperature, the α-glycol resin has a lower molecular weight than the epoxy resin. Thus, it has a low melt viscosity and is suitable as a binder resin for electrophotographic toners used in highspeed copying machines.

Since the α-glycol resin of the invention contains many hydroxyl groups in the molecules, once the resin used as a toner has been melted and fixed, it adheres very firmly to paper by a hydrogen bond, and letters, figures, etc. on the resulting copy do not drop off. Furthermore, since the α-glycol resin has a high melting point, and is crystalline, the toner rapidly cools after fixing, and the transfer process is about 20 to 30% faster than in the case of using a toner composed of an epoxy resin.

The following Examples illustrate the present invention.

The methods for measuring the various properties in the present invention are first described.

VISCOSITY OF A RESIN SOLUTION

The viscosity of a resin is measured by the Gardner-Holdt method at 25° C. using a 40% by weight solution of the resin in butyl carbitol (ASTM D-154-53).

SOFTENING POINT

In a Pyrex test tube having an inside diameter of 1.5±0.1 mm, 3±0.01 g of a resin sample pulverized to a size of 10 to 20 mesh was placed. The test tube was dipped in an oil bath maintained at a temperature about 10° C. higher than the melting point of the sample to melt the resin uniformly. A thermometer was inserted and fixed in position in the test tube so that about half of the bulb at the lower part of the thermometer was placed in the molten resin. The temperature of the oil bath was lowered to a temperature about 30° C. lower than the melting point of the resin. When the sample solidified, 50±0.1 g of mercury was placed in the upper portion of the sample, and the oil bath was heated so that the temperature rose at a rate of 2° C. per minute as read by thermometer inserted in the sample. The temperature at which the molten resin coming afloat appeared first on the surface of mercury was read, and made the softening point of the resin (Durran's mercury method). Its details are described in H. A. Gardner et al.

"Physical and Chemical Examination of Paints, Varnishes, Lacquers and Colors" (11th edition), page 468, H. A. Gardner Lab. (1950).

DETERMINATION OF THE α-GLYCOL GROUP CONTENT

A sample was precisely weighed into a 300 ml Erlenmeyer flask, and 25 ml of chloroform was added to dissolve the sample. The flask was immersed for 30 minutes in a water bath at 0° C., and then 25 ml of a solution of ammonium benzyltrimethyl periodide was added. The flask was further maintained for 2.5 hours in a water bath at 0° C. Then, 5 ml of a 10% solution of sulfuric acid and 15 ml of a 20% solution of potassium iodide were added, and the mixture was titrated with a 0.1N standard solution of sodium thiosulfate.

As a blank, the same procedure was repeated without placing the sample into the flask.

The α-glycol group content was determined in accordance with the following formula.

$$\alpha\text{-Glycol group content (equivalent/1000 g)} = \frac{(B - S) \times N \times F}{200 \times W}$$

B: the amount of the standard solution of sodium thiosulfate consumed in the blank.

S: the amount of the standard solution of sodium thiosulfate consumed in the measurement of the α-glycol group content of the sample.

N: the normality of the standard solution of sodium thiosulfate.

F: the factor of the standard solution of sodium thiosulfate.

W: the weight of the sample taken.

DETERMINATION OF THE PHENOLIC HYDROXYL GROUP CONTENT

A precisely weighed sample was dissolved in chloroform in a 50 ml flask, and a given amount of the solution was taken into a 50 ml Erlenmeyer flask, and 5 ml of periodic acid was added and mixed. After allowing the flask to stand for 45 minutes, it was placed in a 10 mm absorption cell, and the absorbance of the sample solution in comparison with that of a blank solution was measured by using light with a wavelength of 418 mμ by means of a infrared spectrophotometer. The blank solution was prepared by mixing 5 ml of chloroform and 5 ml of periodic acid. By using the difference in absorbance, the amount of phenolic hydroxyl groups was determined from a calibration curve prepared by using reagent-grade bisphenol A.

DETERMINATION OF THE EPOXY GROUP CONTENT

Measured in accordance with the method of ASTM D-1652.

DETERMINATION OF THE BROMINE CONTENT

Measured by the method of ASTM D-1847-78.

DETERMINATION OF SAPONIFIABLE CHLORINE

Measured by the method of ASTM D-1726.

ERICHSEN TEST

A coated film formed on a mild steel panel was used as a sample, and measured by using an Erichsen testing machine of the specification according to JIS B7729.

CROSSCUT TEST

A coated film formed on a mild steel panel was cut lengthwise and crosswise to form 100 squares each having a size of 1×1 mm. An adhesive tape was applied to the cut surface, and then peeled off. The number of remaining squares was determined.

PENCIL HARDNESS, DU PONT IMPACT STRENGTH AND CHEMICAL RESISTANCE

Measured by JIS K-5400.

In the following Examples, all parts and percentages are by weight unless otherwise indicated.

EXAMPLE 1

A 10-liter stainless steel reactor was charged with 100 parts of 2,2-bis(4-hydroxyphenyl)propane, 61 parts of epichlorohydrin, 140 parts of water and 1 part of tetramethyl ammonium bromide, and they were mixed with stirring. The resulting mixture was heated to 120° C. with stirring, and reacted at this temperature for 30 minutes. Then, the reaction mixture was cooled to 100° C., and 120° parts of a 25% aqueous solution of sodium hydroxide was added over the course of 15 minutes. The mixture was further stirred for 35 minutes at 100° C. Furthermore, 330 parts of methyl isobutyl ketone was added to the reaction mixture, and the mixture was sufficiently stirred at 120° C. to dissolve the resin. The resulting mixture was allowed to stand stationary, and the lower aqueous layer was separated and removed. The upper methyl isobutyl ketone layer was washed twice with warm water, and the methyl isobutyl ketone was distilled off to afford 130 parts of a pale yellow resin. The viscosity, melting point, α-glycol group content, phenolic hydroxyl group content, epoxy group content and saponificable chlorine content of the resulting resin are shown in Table 1.

16 Parts of the resin obtained by the above method was dissolved in 10 parts of Cellosolve acetate, 5 parts of methyl isobutyl ketone and 10 parts of xylene, and then mixed with 16 parts of Coronate L (a trademark for a commercially available polyisocyanate-type curing agent made by Nippon Polyurethane Kogyo K. K.). The resulting solution was coated on an iron plate, allowed to stand at room temperature for 1 day, then heated to 100° C. and baked at this temperature for 2 hours to form a colorless transparent coated film (A).

A colorless transparent coated film (B) was formed by the same procedure as above except that commercially available epoxy resin, Epikote 1007 (a trademark for a product of Shell Chemical) was used.

Ten parts of Epikote 1007 was dissolved in 3 parts of methyl isobutyl ketone and 6 parts of xylene, and then 1 part of diisopropanolamine was added and reacted at 140° C. for 45 minutes. The reaction mixture was allowed to cool to 75° C. and 6 parts of Cellosolve acetate was added to dissolve the mixture at the same temperature for 15 minutes. The mixture was allowed to cool to room temperature, and mixed with 12 parts of Coronate L. A colorless transpart coating (C) was formed from the resulting solution by the same procedure as described above.

The properties of these coated films A, B and C are shown in Table 2.

Table 2

| Properties of the coated film | Pencil hardness | Erichsen test (mm) | Du Pont impact strength (cm; ¼ inch, 1 kg) | Film thickness (μ) |
|---|---|---|---|---|
| Film A | 3H | 7.8 | 45 | 50–70 |
| Film B | 2H | 7.1 | 25 | 50–70 |
| Film C | 2H | 7.5 | 40 | 50–70 |

EXAMPLE 2

A 10-liter stainless steel reactor was charged with 100 parts of 2,2-bis(4-hydroxyphenyl)propane, 81 parts of epichlorohydrin, 190 parts of water and 1 part of tetramethyl ammonium bromide, and they were mixed with stirring. The resulting mixture was heated to 140° C. with stirring, and reacted at this temperature for 30 minutes. The reaction mixture was cooled to 100° C., and 159 parts of a 25% aqueous solution of sodium hydroxide was added over the course of 15 minutes, and the mixture was stirred for 35 minutes at 100° C.

The reaction mixture was treated by the same procedure as in Example 1 to afford a pale yellow resin having the properties shown in Table 1.

EXAMPLE 3

One hundred (100) parts of 2,2-bis(4-hydroxyphenyl)propane, 31 parts of epichlorohydrin, 35 parts of β-methyl epichlorohydrin, 140 parts of water and 1 part of tetramethyl ammonium bromide were reacted and treated in the same way as in Example 1 to afford a resin having the properties shown in Table 1.

EXAMPLE 4

The same procedure as in Example 1 was repeated except that 5 parts of methyl isobutyl ketone was added as the solvent. There was obtained 131 parts of a resin having the properties shown in Table 1.

EXAMPLE 5

A 10-liter stainless steel reactor was charged with 100 parts of 2,2-bis(4-hydroxyphenyl)propane, 41 parts of epichlorohydrin, 48 parts of glycerin monochlorohydrin and 140 parts of water, and they were mixed with stirring. The resulting mixture was heated to 100° C., and at this temperature, 159 parts of a 25% aqueous solution of sodium hydroxide was added over the course of 15 minutes. The mixture was stirred at the same temperature for 35 minutes. Then, 330 parts of methyl isobutyl ketone was added to the reaction mixture, and the mixture was sufficiently stirred at 120° C. to dissolve it. The mixture obtained was allowed to stand stationary, and the lower aqueous layer was separated and removed. The upper methyl isobutyl ketone layer was washed twice with warm water, and the methyl isobutyl ketone was distilled off to afford 139 parts of a resin having the properties shown in Table 1.

EXAMPLE 6

One hundred (100) parts of 2,2-bis(4-hydroxyphenyl)propane, 47 parts of β-methyl epichlorohydrin, 48 parts of glycerin monochlorohydrin and 140 parts of water were reacted and treated in the same way as in Example 5. The methyl isobutyl ketone layer washed twice with water was obtained. The methyl isobutyl ketone layer was separated and placed in a flask and allowed to cool. On standing for one day, a white resin precipitated. The resin was separated by filtration and dried to afford 120 parts of a white resin having the properties shown in Table 1.

EXAMPLE 7

Thirty-four (34) parts of 2,2-bis(4-hydroxyphenyl)propane, 27 parts of 2,2-bis(3,5-dibromo-4-hydroxyphenyl)propane, 19 parts of epichlorohydrin, 22 parts of glycerin monochlorohydrin, 100 parts of water and 72 parts of a 25% aqueous solution of sodium chloride were reacted and treated by the same method as in Example 5 to afford 78 parts of a resin having the properties shown in Table 1.

EXAMPLE 8

Eighty (80) parts of 2,2-bis(4-hydroxyphenyl) methane, 37 parts of epichlorohydrin, 44 parts of glycerin monochlorohydrin, 140 parts of water and 145 parts of a 25% aqueous solution of sodium hydroxide were reacted and treated in the same way as in Example 5 to afford 90 parts of a resin having the properties shown in Table 1.

EXAMPLE 9

A 10-liter stainless steel reactor was charged with 100 parts of 2,2-bis(4-hydroxyphenyl)propane, 12.2 parts of epichlorohydrin and 140 parts of water, and they were heated to 90° C. while being mixed with stirring. At the same temperature, 23.8 parts of a 25% aqueous solution of sodium hydroxide was added over the course of 10 minutes, and the reaction was performed at this temperature for 20 minutes.

Fifteen (15) parts of the resulting resin was dissolved in 50 parts of methyl isobutyl ketone, and impurities were extracted and removed with water from the methyl isobutyl ketone solution using a separating funnel. The solvent was removed from the methyl isobutyl ketone solution, and a resin having a phenolic hydroxyl group content of 7.160 equivalents/1000 g, a saponifiable chlorine content of 0.213 equivalent/1000 g and a viscosity (G/H) of D+ was obtained.

To the remainder left after the separation of 15 parts of the resin was added 82 parts of glycerin monochlorohydrin. While the temperature of the reaction system was maintained at 100° C., 135 parts of a 25% aqueous solution of sodium hydroxide was added over the course of 15 minutes. The mixture was maintained at this temperature for 35 minutes. To the reaction mixture was added 330 parts of methyl isobutyl ketone, and the mixture was sufficiently stirred at 120° C. to dissolve the resin. The resulting solution was allowed to stand stationary. The lower aqueous layer was removed. The upper methyl isobutyl ketone layer was washed twice with warm water, and the methyl isobutyl ketome was distilled off to afford 140 parts of a resin having the properties shown in Table 1.

EXAMPLE 10

One hundred (100) parts of the resin obtained in Example 3, 7 parts of 2,2-bis(4-hydroxyphenyl)propane and 0.02 part of sodium hydrogen carbonate were stirred in the absence of solvent at 190° C. for 2 hours. The mixture was allowed to cool to afford 105 parts of a resin having the properties shown in Table 1.

Comparative Example 1

A 10-liter stainless steel reactor was charged with 100 parts of 2,2-bis(4-hydroxyphenyl)propane, 61 parts of epichlorohydrin and 1 part of tetramethyl ammonium bromide, and with stirring, they were heated to 120° C. and reacted at this temperature for 30 minutes. Then, the reaction mixture was cooled to 100° C., and 120 parts of a 25% aqueous solution of sodium hydroxide was added over the course of 30 minutes. At the same temperature, the mixture was stirred for 20 minutes, and then treated in the same way as in Example 1 to afford 130 parts of an epoxy resin substantially free from terminal $\alpha$-glycol groups. The properties of the resulting resin are shown in Table 1.

Comparative Example 2

A 10-liter stainless steel reactor was charged with 100 parts of 2,2-bis(4-hydroxyphenyl)propane, 61 parts of epichlorohydrin and 140 parts of water, and with stirring, they were heated to 100° C. At the same temperature, 120 parts of a 25% aqueous solution of sodium hydroxide was added over the course of 15 minutes. The mixture was further stirred for 35 minutes, and then treated in the same way as in Example 1 to afford 131 parts of an epoxy resin substantially free from terminal $\alpha$-glycol groups. The properties of the resulting resin are shown in Table 1.

pane.) The resulting mixture having an NCO/OH equivalent ratio of 0.75 was coated to a thickness of 75 microns at 20° C. on a degreased and washed mild steel panel (cold-rolled steel plate in accordance with JIS G-3141) with a size of 70 mm×150 mm×0.5 mm by means of an applicator to form a clear coated film. The coated film was aged at 20° C. for 14 days, and then its properties were measured. The results are shown in Table 3.

Comparative Examples 3 and 4

To 100 parts of Epikote 1004 (a trademark for an epoxy resin made by Shell Chemical) was added 120 parts of a mixture of Cellosolve acetate, xylene and methyl isobutyl ketone at a weight ratio of 2:2:1. The mixture was placed in a vessel equipped with a closed stirrer, a thermometer and a reflux condenser, and heated to 100° C. to dissolve the resin. Then, 19 parts of diisopropanolamine was added, and the mixture was heated at 115° C. for 3 hours under reflux. It was then cooled to 75° C., and filtered to afford a solution of a diisopropanolamine-modified epoxy resin having a solids concentration of 50% by weight.

In Comparative Example 3, a coating solution was prepared from 100 parts of the modified epoxy resin and 65 parts of Coronate L. In Comparative Example 4, a coating solution was prepared from 50 parts of Epikote 1009 (a trademark for an epoxy resin made by Shell Table 1

| Process, purification method, and Comparative Examples / Characteristic values of the resin | Process A | | | | Process B | | | |
|---|---|---|---|---|---|---|---|---|
| | Example 1 | Example 2 | Example 3 | Example 4 | Example 5 | Example 6 | Example 7 | Example 8 |
| Viscosity (Gardner-Holdt method) | V-W | L-M | J | U$^+$ | P-Q | H | G$^+$ | G-H |
| Softening point (°C.) (Durran's method) | 121 | 95 | 101 | 113 | 104 | 94 | 104 | 76 |
| Terminal group content | | | | | | | | |
| $\alpha$-glycol group (equivalent/1000 g) | 0.994 | 2.005 | 0.900 | 0.885 | 1.795 | 2.369 | 1.495 | 2.547 |
| Phenolic hydroxyl group (equivalent/1000 g) | 0.017 | 0.120 | 0.017 | 0.014 | 0.015 | 0.019 | 0.020 | 0.029 |
| Epoxy group (equivalent/1000 g) | 0.131 | 0.008 | 0.668 | 0.320 | 0.020 | 0.034 | 0.268 | 0.015 |
| Soluble chlorine (equivalent/1000 g) | 0.005 | 0.008 | 0.003 | 0.003 | 0.001 | 0.002 | 0.014 | 0.003 |
| Bromine content (wt. %) | — | — | — | — | — | — | 18.6 | — |

| Process, purification method, and Comparative Examples / Characteristic values of the resin | Process C | Purification method | Comparative Examples | |
|---|---|---|---|---|
| | Example 9 | Example 10 | Comparative Example 1 | Comparative Example 2 |
| Viscosity (Gardner-Holdt method) | E$^-$ | T-U | E$^+$ | E$^+$ |
| Softening point (°C.) (Durran's method) | 67 | 120 | 68 | 69 |
| Terminal group content | | | | |
| $\alpha$-glycol group (equivalent/1000 g) | 3.666 | 0.899 | 0.055 | 0.171 |
| Phenolic hydroxyl group (equivalent/1000 g) | 0.628 | 0.268 | 0.001 | 0.002 |
| Epoxy group (equivalent/1000 g) | 0.002 | 0.178 | 2.119 | 2.118 |
| Soluble chlorine (equivalent/1000 g) | 0.001 | 0.002 | 0.008 | 0.002 |
| Bromine content (wt. %) | — | — | — | — |

EXAMPLE 11

Fifty (50) parts of the $\alpha$-glycol resin obtained in Example 2 was dissolved in 50 parts of ethyl acetate. The solution was uniformly mixed with 66 parts of Coronate L (a trademark for a product of Nippon Polyurethane Co. Ltd.; an isocyanate prepolymer resulting from the addition of tolylene diisocyanate to trimethylol pro- Chemical), 45 parts of Coronate HL and 50 parts of ethyl acetate. The NCO/OH equivalent ratio was 0.75 in both Comparative Examples. Each of these solutions was applied to a mild steel panel in the same way as in Example 1 to form a clear coated film. The properties of the coated films are shown in Table 3.

It is seen from the results shown in Table 3 that coated films prepared from the resin composition of this invention have superior chemical resistance.

Table 3

| | | Example 11 | Comparative Example 3 | Comparative Example 4 |
|---|---|---|---|---|
| | Thickness of the film (μ) | 75 | 75 | 75 |
| | Time required for curing and drying | | | |
| | at 20° C., hours | 6.0 | 5.0 | 10.5 |
| | at 5° C., hours | 20 | 17 | 36 |
| Physical | Pencil hardness | 2H | 2H | 2H |
| Properties | Du Pont impact test (cm; ½ inch, 0.5 kg) | 20 | 20 | 20 |
| | Erichsen test (mm) | 3.5 | 4.0 | 3.0 |
| | Crosscut tape test | 100/100 | 50/100 | 70/100 |
| Chemical resistance | Water resistance (tap water) | No change | No change | No change |
| | Acid resistance | | | |
| | to 10% sulfuric acid | No change | Blister occurred | Blister occurred |
| | to 20% sulfuric acid | " | " | " |
| | Alkali resistance | | | |
| | to 10% sodium hydroxide | " | No change | No change |
| | to 20% sodium hydroxide | " | Color slightly changed | Color slightly changed |
| | Resistance to salt spray | " | No change | " |

In determining these properties, the coated films were exposed to the specified conditions at 20° C. for one month.

EXAMPLE 12

A mixture of 100 parts of 2,2-bis(4-hydroxyphenyl)-propane, 54 parts of epichlorohydrin, 125 parts of water and 1 part of tetramethyl ammonium bromide was placed in a reactor, and stirred. The resulting mixture was heated to 120° C. with stirring, and reacted at this temperature for 30 minutes. The reaction mixture was cooled to 100° C., and 110 parts of a 25% aqueous solution of sodium hydroxide was added over the course of 15 minutes. The mixture was further stirred at 100° C. for 35 minutes.

The reaction mixture was treated in the same way as in Example 2 to afford a pale yellow resin having a molecular weight of about 3,000.

The resin obtained had a viscosity (measured by the Gardner-Holdt method) of Y+, a softening point of 130.4° C. and an α-glycol group content of 0.648 equivalent/1000 g.

EXAMPLE 13

Fifty (50) parts of the resin was dissolved in 50 parts of ethyl acetate, and to the resulting solution were added 125 parts of purified tar (Tarcron 180, a trademark for a product of Yoshida Seiyusho K.K.), 50 parts of talc ("PK Talc", a trademark for a product of Maruo Talc K.K.), 2 parts of an aerosol ("Aerosil 200", a trademark for a product of Nippon Aerosil K.K.) and 50 parts of a mixture of ethyl acetate, butyl acetate, Cellosolve acetate and toluene in weight ratio of 1:1:1:1. They were mixed for 24 hours in a ball mill to disperse the tar and pigment uniformly. The resulting mixture was mixed with 31 parts of Coronate L. The NCO/OH equivalent ratio was 0.5.

The mixture was coated to a thickness of 100 microns on a mild steelpanel in the same way as in Example 1, and allowed to stand for 14 days at 20° C. Then, the properties of the coated film were measured. The results are shown in Table 4.

Comparative Example 5

In the same way as in Comparative Examples 3 and 4, 100 parts of Epikote 1007, 9 parts of diisopropanolamine and 110 parts of a mixture of Cellosolve acetate, xylene and methyl isobutyl ketone in a weight ratio of 2:2:1 were treated to form a diisopropanolamine-modified epoxy resin (a solution having a solids concentration of 50% by weight).

One hundred parts of the modified epoxy resin obtained, 31 parts of Coronate L, 80 parts of Tarcron, 50 parts of PK Talc, and 2 parts of Aerosil 200 were mixed to form a coating solution with an NCO/OH equivalent ratio of 0.5.

The coating solution was applied to a mild steel panel in the same way as in Example 1 to form a coated film. The properties of the coated film are shown in Table 4.

Table 4

| | | Example 12 | Comparative Example 5 |
|---|---|---|---|
| | Thickness of the film (μ) | 100 | 100 |
| | Time required for curing and drying | | |
| | at 20° C., hours | 4.5 | 4.0 |
| | at 5° C., hours | 16 | 15 |
| | Pencil hardness | 3B | B |
| Physical properties | Du Pont impact strength (cm, ½ inch, 0.5 kg) | above 50 | 45 |
| | Erichsen test (mm) | 7.2 | 5.5 |
| | Crosscut tape test | 100/100 | 100/100 |
| | Water resistance (tap water) | No change | No change |
| Chemical resistance | Acid resistance | | |
| | to 10% sulfuric acid | " | Blister occurred |
| | to 20% sulfuric acid | " | The film was peeled and broken |
| | Alkali resistance | | |
| | to 10% sodium hydroxide | " | No change |
| | to 20% sodium hydroxide | " | Color changed slightly |

Table 4-continued

|  | Example 12 | Comparative Example 5 |
| --- | --- | --- |
| Resistance to salt spray | " | No change |

EXAMPLE 13

Preparation of an α-glycol resin having an average n of 4.3:

A 10-liter stainless steel reactor was charged with 100 parts of 2,2-bis(4-hydroxyphenyl)propane, 45 parts of epichlorohydrin, 44 parts of glycerin monochlorohydrin and 140 parts of water, and they were mixed with stirring.

The product was heated to 100° C., and at the same temperature, 159 parts of a 25% by weight aqueous solution of sodium hydroxide was added over the course of 15 minutes. The mixture was stirred at this temperature for 35 minutes. Then, 330 parts by weight of methyl isobutyl ketone was added to the mixture and the mixture was sufficiently stirred at 120° C. to dissolve the resin. The resulting mixture was allowed to stand stationary, and the lower aqueous layer was separated and removed. The upper methyl isobutyl ketone layer was washed twice with warm water, and the methyl isobutyl ketone was distilled off to afford 139 parts of an α-glycol resin. The average molecular weight ($\overline{Mn}$), glass transition temperature (Tg), and softening point (Ts) of the resin are shown in Table 5 below in comparison with those of an epoxy resin (Epikote 2057 GP, a trademark for a product of Shell Chemical) and a styrene resin (Piccolastic D-125, a trademark for a product of Esso Standard Oil Co., Ltd.) which are binder resins for toners with approximately the same Tg.

Table 5

|  | $\overline{Mn}$ | Tg (°C.) | Ts (°C.) |
| --- | --- | --- | --- |
| α-glycol resin of Example 13 | 1600 (average n = 4.3) | 51 | 109 |
| Epikote 2057 GP | 1900 | 51 | 109 |
| Piccolastic D-125 | 3000 | 50 | 132 |

The various properties shown in Table 5 were measured by the following methods.

Number average molecular weight ($\overline{Mn}$)

Measured by a vapor pressure permeating method using methyl ethyl ketone as a solvent in a molecular weight measuring device (Model 115, a product of Hitachi Limited).

Glass transition temperature (Tg)

Determined from a flex point of specific heat by using a differential scanning calorimeter (Model DSC-1B, a product of Perkin Elmer).

Softening point (Ts)

Measured by the ring-and-ball method in accordance with JIS K-2531.

Forty parts of the resulting α-glycol resin, 60 parts of a styrene/n-butyl methacrylate copolymer (Higher SBM-73, a trademark for a product of Sanyo Chemical Co., Ltd.), 10 parts of Mogul A (a trademark for channel carbon black, a product of Cabot Corporation), and 2.5 parts of Nigrosine SSB dye were melt-kneaded at 140° to 160° C. The mixture was cooled, and finely pulverized by a jet mill and sorted out by a Microprex (a trademark for an air shifter made by Alpine Corp.) to collect particles having a size of 5 to 20 microns. The resulting electrophotographic toner was mixed with an iron powder having a Tyler mesh of 200 to 300 to form a developer. A negative latent image on a zinc oxide-coated photosensitive sheet was developed with the resulting developer to form a positive image. The developed toner image was transferred to a high quality paper sheet, and fixed by a press-roll fixing device heated at 140° C. A clear copy was obtained. A microscopic examination of the surface and the cross section of the copy showed that the toner particles well adhered to one another and penetrated into the paper. An adhesive tape (1 cm × 5 cm in size) was placed on the solid black portion of the copy and a roll weighing 1 kg was turned over it to adhere the tape. Then, the tape was peeled off at a rate of 5 mm/sec. to examine its adhesion. There was hardly any adhesion of the toner to the adhesive tape.

Comparative Example 6

Electrophotographic toners having the following compositions A and B were prepared in the same way as in Example 13 except that 100 parts of each of Piccolastic D125 and Epikote 2057GP was used instead of 40 parts of the α-glycol resin and 60 parts of the styrene/n-butyl methacrylate copolymer.

| Composition A | |
| --- | --- |
| Piccolastic D125 | 100 parts |
| Mogul A | 10 parts |
| Nigrosine SSB dye | 2.5 parts |
| Composition B | |
| Epikote 2057GP | 100 parts |
| Mogul A | 10 parts |
| Nigrosine SSB dye | 2.5 parts |

Using these toners, the same microscopic examination and the tape adhesion test as in Example 13 were performed. In a copy obtained by using toner A, the toner particles were not fully melted, and were of a lumpy structure, No penetration into the mesh structure of the paper was noted, and the toner mostly adhered to the adhesive tape.

In a copy obtained by using toner B, the particles adhered well to one another and were of a smooth structure. But there was little penetration of the particles into the mesh structure of the paper, and the toner particles considerably adhered to the adhesive tape.

EXAMPLE 14

One mole of bisphenol F, 1 mole of epichlorohydrin, 1 mole of α-monochlorohydrin and 19.3 moles of water were placed in a stainless steel reactor, and with stirring, heated to 100° C. A 25% aqueous solution of sodium hydroxide (2.26 moles) was added over the course of 15 minutes. The mixture was stirred for 35 minutes at this temperature and cooled to afford a resin having the following properties.

Viscosity (Gardner-Holdt method): G-H
Gardner color: 3-4
Softening point (Durran's method): 76° C.

Terminal group contents

| | |
|---|---|
| α-Glycol group | 2.547 equivalents/1000 g |
| Phenolic hydroxyl group | 0.029 equivalents/1000 g |
| Epoxy group | 0.015 equivalents/1000 g |
| Saponifiable chlorine | 0.003 equivalents/1000 g |

What we claim is:

1. A process for preparing an α-glycol resin composition having a viscosity, measured at 25° C. by the Gardner-Holdt method for a 40% by weight solution in butyl carbitol of C to $Z_8$ and expressed by the following formula

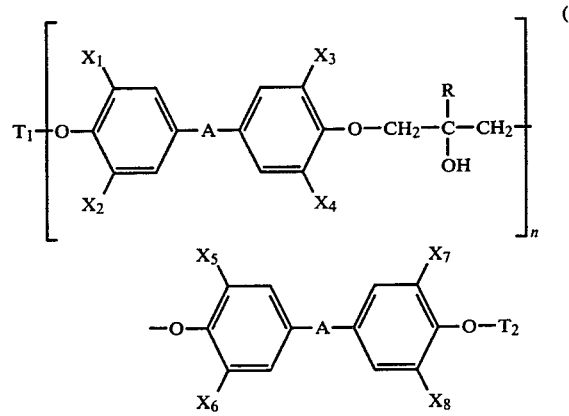

wherein A represents the group —$CH_2$—, $$-\underset{\underset{CH_3}{|}}{\overset{\overset{CH_3}{|}}{C}}-, \text{ or } -\underset{\underset{O}{\|}}{\overset{\overset{O}{\|}}{S}}-;$$

R represents a hydrogen atom or a methyl group; $X_1$, $X_2$, $X_3$, $X_4$, $X_5$, $X_6$, $X_7$ and $X_8$ are identical or different and each represent a hydrogen, chlorine or bromine atom; $T_1$ and $T_2$ represent terminal groups which are identical or different and are atoms or atomic groupings selected from the group consisting of

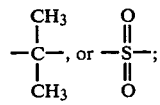 (T-1)

(T-2) a hydrogen atom (—H),

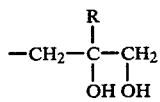 (T-3)

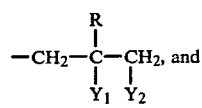 (T-4)

in which R is as defined above, one of $Y_1$ and $Y_2$ represents a hydroxyl group and the other represents a chlorine or bromine atom; and n represents the average degree of polymerization of the resin which is a positive number greater than 0, and at least 40 mole% of its entire terminal groups (the sum of $T_1$ and $T_2$) consists of α-glycol groups of the following formula $$-CH_2-\underset{\underset{OH}{|}}{\overset{\overset{R}{|}}{C}}-CH_2$$
$$\phantom{-CH_2-C}OH$$

which comprises reacting a dihydric phenol compound expressed by the following formula $$HO-\underset{X_2}{\overset{X_1}{\bigcirc}}-A-\underset{X_4}{\overset{X_3}{\bigcirc}}-OH$$

wherein A represents the group —$CH_2$—, $$-\underset{\underset{CH_3}{|}}{\overset{\overset{CH_3}{|}}{C}}-, \text{ or } -\underset{\underset{O}{\|}}{\overset{\overset{O}{\|}}{S}}-,$$

and $X_1$, $X_2$, $X_3$ and $X_4$ are identical or different and each represent a hydrogen, chlorine or bromine atom, an epihalohydrin of the following formula $$YCH_2-\underset{}{\overset{\overset{R}{|}}{C}}\underset{O}{\diagdown\diagup}CH_2$$

wherein R represents a hydrogen atom or a methyl group and Y represents a chlorine or bromine atom, and at least 4 moles, per mole of the epihalohydrin, of water in the presence of an etherification catalyst for the dihydric phenol compound and epihalohydrin, and reacting the resulting product with an alkali metal hydroxide.

2. The process of claim 1 wherein the amount of water is at least 6 moles per mole of the epihalohydrin.

3. The process of claim 1 or 2 wherein the reaction of the dihydric phenol compound, the epihalohydrin and water is carried out at a temperature of 90° to 150° C.

4. The process of claim 1 or 2 wherein the etherification catalyst is a tertiary phosphine, a quaternary phosphonium compound, an organic sulfide, an organic sulfonium compound, a betaine compound, a tertiary amine, or a quaternary ammonium compound.

5. The process of claim 3 wherein the etherification catalyst is a tertiary phosphine, a quaternary phosphonium compound, an organic sulfide, an organic sulfonium compound, a betaine compound, a tertiary amine, or a quaternary ammonium compound.

6. The process of claim 1 wherein the amount of water is from 6 moles to 12 moles per mole of the epihalohydrin.

7. The process of claim 6 wherein the reaction of the dihydric phenol, epihalohydrin and water is carried out at a temperature of 100° to 140° C.

8. The process of claim 7 wherein the amount of the etherification catalyst is from about 0.002 to 0.5 mole % based on the phenolic hydroxyl groups.

9. The process of claim 8 wherein the etherification catalyst is a quaternary ammonium compound.

10. The process of claim 9 wherein the quaternary ammonium compound is tetramethyl ammonium chloride, tetraethyl ammonium chloride or tetramethyl ammonium bromide.

11. The process of claim 10 wherein the reaction with the alkali metal hydroxide is at a temperature of from 60° to 150° C.

12. The process of claim 11 wherein the amount of the alkali metal hydroxide is at least 1 mole per mole of epihalohydrin.

13. The process of claim 12 wherein the reaction between the dihydric phenol compound, epihalohydrin and water is carried out for at least five minutes and the reaction of the resulting product with the alkali metal hydroxide is carried out for at least fifteen minutes.

14. The process of claim 12 wherein the reaction between the dihydric phenol compound, epihalohydrin and water is carried out for at least ten minutes and the reaction of the resulting product with the alkali metal hydroxide is carried out for at least twenty minutes.

15. The process according to claims 1 or 14 wherein the group A in the formula for the dihydric phenol compound represents the group

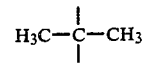

and each of $X_1$, $X_2$, $X_3$ and $X_4$ are simultaneously either hydrogen or bromine.

16. The process according to claim 15 wherein the epihalohydrin is epichlorohydrin.

17. The process according to claims 1 or 13 wherein the dihydric phenol compound is bisphenol A and the epihalohydrin is epichlorohydrin.

18. The process of claim 1 wherein at least 60 mole % of the entire terminal groups of the alpha-glycol resin consists of the alpha-glycol groups of formula (T-1).

19. The process of claim 1 wherein from 70 to 95 mole % of the entire terminal groups of the alpha-glycol resin consists of the alpha-glycol groups of formula (T-1).

* * * * *